US012006047B2

United States Patent
Silin et al.

(10) Patent No.: US 12,006,047 B2
(45) Date of Patent: Jun. 11, 2024

(54) PROPELLER DEICING SYSTEMS AND METHODS

(71) Applicant: FLIR Unmanned Aerial Systems ULC, Vancouver (CA)

(72) Inventors: Dmytro Silin, Waterloo (CA); Albert Pegg, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 0 days.

(21) Appl. No.: 17/850,210

(22) Filed: Jun. 27, 2022

(65) Prior Publication Data

US 2022/0411075 A1    Dec. 29, 2022

Related U.S. Application Data

(60) Provisional application No. 63/216,455, filed on Jun. 29, 2021.

(51) Int. Cl.
*B64D 15/04*    (2006.01)
*B64C 39/02*    (2023.01)
(Continued)

(52) U.S. Cl.
CPC ............ *B64D 15/04* (2013.01); *B64C 39/024* (2013.01); *B64U 10/13* (2023.01); *B64U 30/20* (2023.01); *B64U 50/19* (2023.01)

(58) Field of Classification Search
CPC ...... B64D 15/02; B64D 15/04; B64D 13/006; B64U 20/94; B64U 20/96; B64C 27/18
See application file for complete search history.

(56) References Cited

U.S. PATENT DOCUMENTS

2010/0074758 A1* 3/2010 Rawdon .............. F03D 1/0675
                                                      415/4.1
2015/0125309 A1* 5/2015 Lauritsen .............. F03D 80/40
                                                     416/97 R
(Continued)

FOREIGN PATENT DOCUMENTS

CA    2746418 A1    7/2010
CA    2751861 A1    3/2012
(Continued)

OTHER PUBLICATIONS

Acecore Technologies, Zoe—"Zoe X4", 2017. [Downloaded: https://acecoretechnologies.com/zoe/ ].

(Continued)

*Primary Examiner* — Richard Green
*Assistant Examiner* — Arfan Y. Sinaki
(74) *Attorney, Agent, or Firm* — Haynes and Boone, LLP

(57) ABSTRACT

Techniques for deicing propellers for mobile platforms are disclosed. In one embodiment, a system is provided. The system may include a propeller comprising a propeller blade having a channel extending from an ingress aperture to an egress aperture along a longitudinal axis of the propeller blade. The system may further include a cowl comprising an air duct configured to direct heated air into the channel to deice the propeller blade. The cowl may be configured to selectively couple to the propeller and an electric motor and form a seal between the cowl and the electric motor to capture the heated air exuded by the electric motor. Additional systems and methods are also disclosed.

20 Claims, 6 Drawing Sheets

(51) Int. Cl.
*B64U 10/13* (2023.01)
*B64U 30/20* (2023.01)
*B64U 50/19* (2023.01)

(56) References Cited

U.S. PATENT DOCUMENTS

2020/0172259 A1* 6/2020 Hinderliter ............ B64D 27/24
2023/0174241 A1* 6/2023 Palacios ................ B64D 15/02
244/134 B

FOREIGN PATENT DOCUMENTS

| EP | 2427372 B1 | 10/2013 |
| EP | 2919555 B1 | 11/2015 |
| EP | 1851110 B1 | 6/2016 |
| EP | 2762407 B1 | 9/2017 |
| EP | 2915747 B1 | 5/2018 |

OTHER PUBLICATIONS

T-Motor, "U13II KV130, Motors Work at Ease in High Temperature", retrieved from the Internet Jan. 6, 2021. [Downloaded: https://store.tmotor.com/goods.php?id=767 ].

* cited by examiner

PROPELLER DEICING SYSTEMS AND METHODS

CROSS REFERENCE TO RELATED APPLICATIONS

This application claims priority to and the benefit of U.S. Provisional Patent Application No. 63/216,455 filed Jun. 29, 2021 and entitled "PROPELLER DEICING SYSTEMS AND METHODS," which is incorporated herein by reference in its entirety.

TECHNICAL FIELD

One or more embodiments relate generally to mobile platforms and more particularly, for example, to systems and methods for deicing propeller blades for a mobile platform.

BACKGROUND

Electrically powered aircraft, and particularly multi-rotor aircraft, have become popular in recent years. Unmanned versions of such aircraft are used in photography, video surveillance, package delivery, agriculture monitoring, reconnaissance, exploration, transportation, and many other applications. Providing safe all-weather operation capabilities for multi-rotor and single-rotor aircraft is an important design criterion for both manned and unmanned aircraft. There are many challenges in providing safe all-weather operation capabilities for aircraft. For example, when operating in rain and snow, an aircraft should be well protected against water ingress. However, when that same aircraft operates in hot environments, its water-tight body might face problems in dissipating heat from motors and other components. Further challenges are faced when the aircraft operates in humid air and in temperatures near the water freezing point as these factors may impose a high risk of ice formation on propeller blades of the aircraft.

Deicing and preventing ice formation on propellers of electrically powered aircraft is a difficult problem to solve. One reason for this difficulty, in the case of unmanned aircraft, is that an unmanned aircraft typically operates at low-altitudes, which makes ice formation on propeller blades likely when the aircraft is also operating in cold, misty, air. A reason for the difficulty, in the case of relatively small aircraft, is that such aircraft have space and component constraints. Another reason for the difficulty, in the case of relatively small aircraft, is that deicing infrastructure is generally unavailable. For example, spray towers at airports are generally unavailable for a small drone. Thus, there is a need in the art for improved deicing and ice prevention techniques.

SUMMARY

Various devices, systems, and methods related to deicing a mobile platform are disclosed herein. In one embodiment, a system for deicing a mobile platform is provided. The system may include a propeller that has at least one propeller blade having a channel extending from an ingress aperture to an egress aperture along a longitudinal axis of the propeller blade. The system may further include a cowl having an air duct configured to direct heated air into the channel to deice the propeller blade. The cowl may be configured to selectively couple to the propeller and an electric motor and form a seal between the cowl and the electric motor to capture heated air exuded by the electric motor.

In another embodiment, a method for deicing the mobile platform is provided. The method may include activating the electric motor to generate a thrust for the mobile platform via a rotation of the propeller. The method may further include capturing passively heated air exuded by the electric motor using the cowl and directing the captured heated air into the channel of the propeller blade via the air duct to thereby deice the propeller blade.

The scope of the invention is defined by the claims, which are incorporated into this section by reference. A more complete understanding of further embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
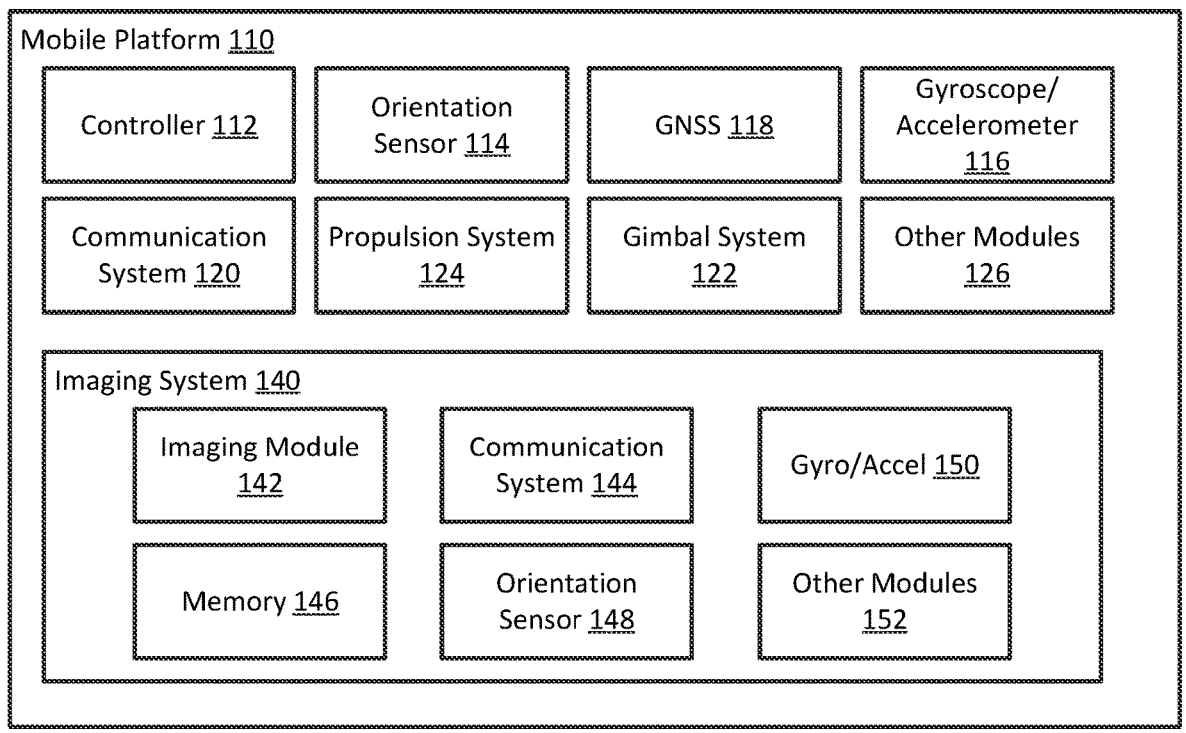
FIG. 1 illustrates a block diagram of a mobile platform in accordance with one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The present disclosure provides devices, systems, and methods to deice and prevent ice formation on propellers of mobile platforms (e.g., aircraft, unmanned aerial vehicles (UAVs), drones, etc.). Given the size and efficiency of today's electrically powered multi-rotor drones, a deicing system should have minimal weight and physical dimensions and should be able to use passive techniques to deice and prevent ice formation on propellers of a drone (e.g., not using onboard energy for active deicing). For greater interoperability, the system should be compatible with existing drones.

In some embodiments of the present disclosure, hot air is collected by a cowl installed between an electric motor and a propeller that has hollow propeller blades. A side of the cowl that faces the electric motor may be shaped to form a seal that completely covers cooling windows (e.g., vents) of a rotor of the electric motor. A side of the cowl facing the propeller may have air ports that are aligned with ingress apertures of the hollow propeller blades. The captured hot air exuded from the electric motor may flow through an air duct(s) of the cowl to the air ports and into the ingress apertures of the hollow propeller blades. An activation of the electric motor may cause rotation of the electric motor's rotor, which may cause ambient air to enter motor cooling windows in a stator of the electric motor. The ambient air may be passively heated when passing through active components of the electric motor during operation of the electric motor. Upon existing the electric motor through the cooling windows in the rotor, the heated air may be captured by the cowl and directed by the cowl into the hollow propeller blades. The hot air passing through the hollow propeller blades may deice the propeller blades and prevent ice formation. Further embodiments of the present disclosure will be discussed below.

Referring to FIG. 1, illustrated is a block diagram of a mobile platform 110, in accordance with one or more embodiments of the disclosure. In various implementations, mobile platform 110 may be configured to fly over a scene or survey area, to fly through a structure, or to approach a target and image or sense the scene, structure, or target, or portions thereof, using gimbal system 122 to aim imaging system/sensor payload 140 at the scene, structure, or target, or portions thereof, for example. Resulting imagery and/or other sensor data may be processed (e.g., by controller 112) and displayed to a user through use of user interface at a base station (e.g., one or more displays such as a multi-function display (MFD), a portable electronic device such as a tablet, laptop, or smart phone, or other appropriate interface) and/or stored in memory for later viewing and/or analysis. In some embodiments, mobile platform 110 configured to use such imagery and/or sensor data to control operation of mobile platform 110 and/or imaging system 140, such as controlling gimbal system 122 to aim imaging system 140 towards a particular direction, or controlling propulsion system 124 to move mobile platform 110 to a desired position in a scene or structure or relative to a target.

In some embodiments, mobile platform 110 may be implemented as a mobile platform configured to move or fly and position and/or aim imaging system 140 (e.g., relative to a selected, designated, or detected target). As shown in FIG. 1, mobile platform 110 may include one or more of a controller 112, an orientation sensor 114, a gyroscope/accelerometer 116, a global navigation satellite system (GNSS) 118, a communication system 120, a gimbal system 122, a propulsion system 124, and other modules 126. Operation of mobile platform 110 may be substantially autonomous and/or partially or completely controlled by a base station, which may include one or more of a user interface, a communication system, and other modules. In other embodiments, mobile platform 110 may include one or more of the elements of the base station, such as with various types of manned aircraft, terrestrial vehicles, and/or surface or subsurface watercraft. Imaging system 140 may be physically coupled to mobile platform 110 and be configured to capture sensor data (e.g., visible spectrum images, infrared images, narrow aperture radar data, and/or other sensor data) of a target position, area, and/or object(s) as selected and/or framed by operation of mobile platform 110 and/or the base station.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile platform 110 including its components. Such software instructions may also implement methods for processing infrared images and/or other sensor signals, determining sensor information, providing user feedback (e.g., through the base station), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of mobile platform 110 or the base station. For example, controller 112 may be adapted to store sensor signals, sensor information, parameters for coordinate frame transformations, calibration parameters, sets of calibration points, and/or other operational parameters, over time, for example, and provide such stored data to a user operating the base station.

In some embodiments, controller 112 may be configured to substantially continuously monitor and/or store the status of and/or sensor data provided by one or more elements of mobile platform 110, imaging system 140, and/or the base station, such as the position and/or orientation of mobile platform 110, imaging system 140, and/or the base station, for example.

Orientation sensor 114 may be implemented as one or more of a compass, float, accelerometer, and/or other device capable of measuring an orientation of mobile platform 110 (e.g., magnitude and direction of roll, pitch, and/or yaw, relative to one or more reference orientations such as gravity and/or Magnetic North), gimbal system 122, imaging system 140, and/or other elements of mobile platform 110, and providing such measurements as sensor signals and/or data that may be communicated to various devices of mobile platform 110 or the base station.

Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile platform 110 and/or other elements of system 100 and providing such measurements as sensor signals and/or data that may be communicated to other devices of mobile platform 110 (e.g., controller 112) or the base station. GNSS 118 may be implemented according to any global navigation satellite system, including a GPS, GLONASS, and/or Galileo based receiver and/or other device capable of determining absolute and/or relative position of mobile platform 110 (e.g., or an element of mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of mobile platform 110 or the base station. In some embodiments, GNSS 118 may include an altimeter, for example, or may be used to provide an absolute altitude.

Communication system 120 may be implemented as any wired and/or wireless communications system configured to transmit and receive analog and/or digital signals between mobile platform 110 and the base station. For example, communication system 120 may be configured to receive flight control signals and/or data (e.g., commands) from a communication system of the base station. In other embodiments, communication system 120 may be configured to receive images and/or other sensor information (e.g., visible spectrum and/or infrared still images or video images) from imaging system 140 and relay the sensor data to controller 112 and/or the base station. In some embodiments, communication system 120 may be configured to support spread spectrum transmissions, for example, and/or multiple simultaneous communications channels between mobile platform 110 and the base station. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between devices of mobile platform 110 and mobile platform 110 and the base station substantially continuously, where such data includes various types of sensor data, control parameters, and/or other data, as described herein.

Gimbal system 122 may be implemented as an actuated gimbal mount, for example, that may be controlled by controller 112 to stabilize imaging system 140 relative to a target or to aim imaging system 140 according to a desired direction and/or relative orientation or position. For example, controller 112 may receive a control signal from one or more components of mobile platform 110 or the base station to cause gimbal system 122 to adjust a position of imaging system 140. As such, gimbal system 122 may be configured to provide a relative orientation of imaging system 140 (e.g., relative to an orientation of mobile platform 110) to controller 112 and/or communication system 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/imaging system 140. In further embodiments, gimbal system 122 may be configured to couple to a laser pointer, range finder, and/or other device, for example, to support, stabilize, power, and/or aim multiple devices (e.g., imaging system 140 and one or more other devices) substantially simultaneously.

In some embodiments, gimbal system 122 may be adapted to rotate imaging system 140 +−90 degrees, or up to 360 degrees, in a vertical plane relative to an orientation and/or position of mobile platform 110. In further embodiments, gimbal system 122 may rotate imaging system 140 to be parallel to a longitudinal axis or a lateral axis of mobile platform 110 as mobile platform 110 yaws, which may provide 360 degree ranging and/or imaging in a horizontal plane relative to mobile platform 110. In various embodiments, controller 112 may be configured to monitor an orientation of gimbal system 122 and/or imaging system 140 relative to mobile platform 110, for example, or an absolute or relative orientation of an element of imaging system 140 (e.g., imaging module 142). Such orientation data may be transmitted to other elements of mobile platform 110 for monitoring, storage, further processing, and/or communicating to the base station.

Propulsion system 124 may be implemented as one or more propellers, turbines, or other thrust-based propulsion systems, and/or other types of propulsion systems that can be used to provide motive force and/or lift to mobile platform 110 and/or to steer mobile platform 110. In some embodiments, propulsion system 124 may include multiple propellers (e.g., a tri, quad, hex, oct, or other type "copter") that can be controlled (e.g., by controller 112 sending a control signal to a motor physically coupled to the propeller) to provide lift and motion for mobile platform 110 and to provide an orientation for mobile platform 110. In other embodiments, propulsion system 124 may be configured primarily to provide thrust while other structures of mobile platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used in conjunction with other devices of mobile platform 110 (e.g., controller 112) to provide operational control of mobile platform 110.

In some embodiments, other modules 126 may include one or more actuated and/or articulated devices (e.g., multi-spectrum active illuminators, visible and/or IR cameras, radars, sonars, and/or other actuated devices) coupled to mobile platform 110, where each actuated device includes one or more actuators adapted to adjust an orientation of the device, relative to mobile platform 110, in response to one or more control signals (e.g., provided by controller 112). In particular, other modules 126 may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 and/or monitor communication link quality with the base station.

In embodiments where imaging system 140 is implemented as an imaging device, imaging system 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communication system 144. More generally, imaging module 142 may be configured to perform any of the operations or methods described herein, at least in part, or in combination with controller 112 and/or the base station in communication with mobile platform 110.

In some embodiments, imaging system 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communication system 144 of imaging system 140 may be implemented as any wired and/or wireless communications module configured to transmit and receive analog and/or digital signals between elements of system 100. For example, communication system 144 may be configured to transmit infrared images from imaging module 142 to communication systems 120 or a communication of the base station. In other embodiments, communication system 144 may be configured to receive control signals (e.g., control signals directing capture, focus, selective filtering, and/or other operation of imaging system 140) from controller 112 and/or the base station. In some embodiments, communication system 144 may be configured to support spread spectrum transmissions, for example, and/or multiple simultaneous communications channels between imaging system 140, mobile platform 110, and the base station. In various embodiments, communication system 144 may be configured to monitor and communicate the status of an orientation of the imaging system 140. Such status information may be used, for example, to adjust the orientation of the imaging system 140 to capture images of a target.

Memory 146 may be implemented as one or more machine readable mediums and/or logic devices configured to store software instructions, sensor signals, control signals, operational parameters, calibration parameters, infrared images, and/or other data facilitating operation of mobile platform 110, for example, and provide it to various controller 112 and/or the base station. Memory 146 may also be implemented, at least in part, as removable memory, such as a secure digital memory card for example including an interface for such memory.

Orientation sensor 148 of imaging system 140 may be implemented similar to orientation sensor 114 or gyroscope/accelerometer 116, and/or any other device capable of measuring an orientation of imaging system 140, imaging module 142, and/or other elements of imaging system 140 (e.g., magnitude and direction of roll, pitch, and/or yaw, relative to one or more reference orientations such as gravity, Magnetic North, and/or an orientation of mobile platform 110) and providing such measurements as sensor signals that may be communicated to various devices of mobile platform 110 or the base station. Gyroscope/accelerometer (e.g., angular motion sensor) 150 of imaging system 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of imaging system 140 and/or various elements of imaging system 140 and providing such measurements as sensor signals that may be communicated to various devices of mobile platform 110 or the base station.

Other modules 152 of imaging system 140 may include other and/or additional sensors, actuators, communications modules/nodes, cooled or uncooled optical filters, and/or user interface devices used to provide additional environmental information associated with imaging system 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of mobile platform 110 (e.g., controller 112) to provide operational control of mobile platform 110 or to process imagery to compensate for environmental conditions.

In general, each of the elements of mobile platform 110 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of mobile platform 110 or the base station. In addition, one or more non-transitory mediums may be provided for storing machine readable instructions for loading into and execution by any logic device implemented with one or more of the devices of mobile platform 110. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of mobile platform 110 may include one or more modules supporting wired, wireless, and/or a combination of wired and wireless communication techniques. In some embodiments, various elements or portions of elements of mobile platform 110 may be integrated with each other, for example, or may be integrated onto a single printed circuit board (PCB) to reduce system complexity, manufacturing costs, power requirements, coordinate frame errors, and/or timing errors between the various sensor measurements. Each element of mobile platform 110 may include one or more batteries, capacitors, or other electrical power storage devices, for example, and may include one or more solar cell modules or other electrical power generating devices. In some embodiments, one or more of the devices may be powered by a power source for mobile platform 110, using one or more power leads. Such power leads may also be used to support one or more communication techniques discussed herein.

Figure 2:
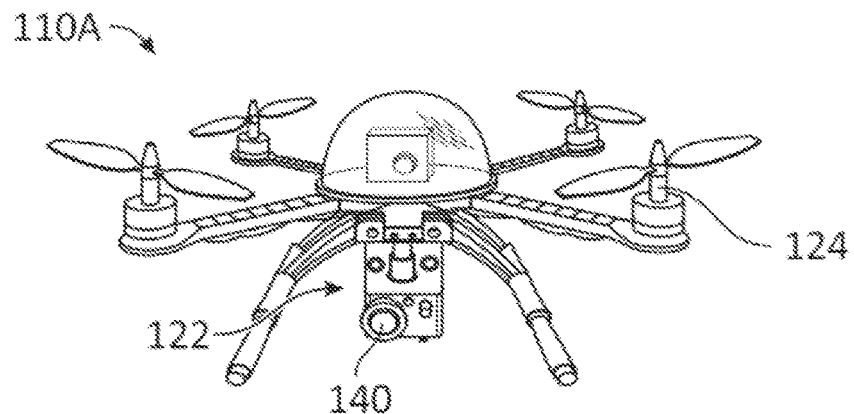
FIG. 2 illustrates a diagram of example mobile platforms in accordance with embodiments of the disclosure.
Figure 2:
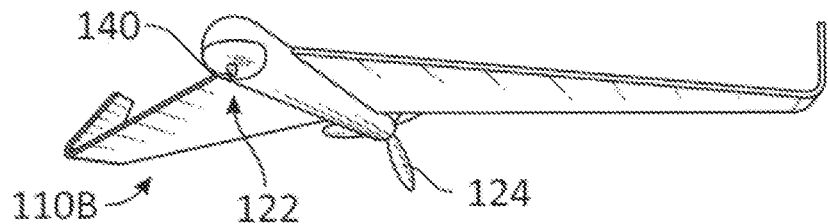

FIG. 2 illustrates a diagram of example mobile platforms 110A and 110B, each with imaging systems 140 and associated gimbal systems 122 in accordance with an embodiment of the disclosure. Mobile platform 110A with articulated imaging system 140 and gimbal system 122, and mobile platform 110B with articulated imaging system 140 and gimbal system 122, in some embodiments, may be in communication with a base station configured to control motion, position, and/or orientation of mobile platform 110A, mobile platform 110B, and/or imaging systems 140. In some embodiments, mobile platforms 110, 110A, and/or 110B may be nodes participating in a mesh network, in some cases along with additional nodes, such as mobile platforms and base stations, of the mesh network. The nodes of the mesh network may exchange information about their respective positions with neighboring nodes. In some embodiments, the nodes may exchange information about their respective positions with neighboring nodes in accordance with a Cursor-on-Target (CoT) communication protocol. In further embodiments, the position information shared between nodes may include GPS coordinate positions for the respective nodes.

Figure 3:
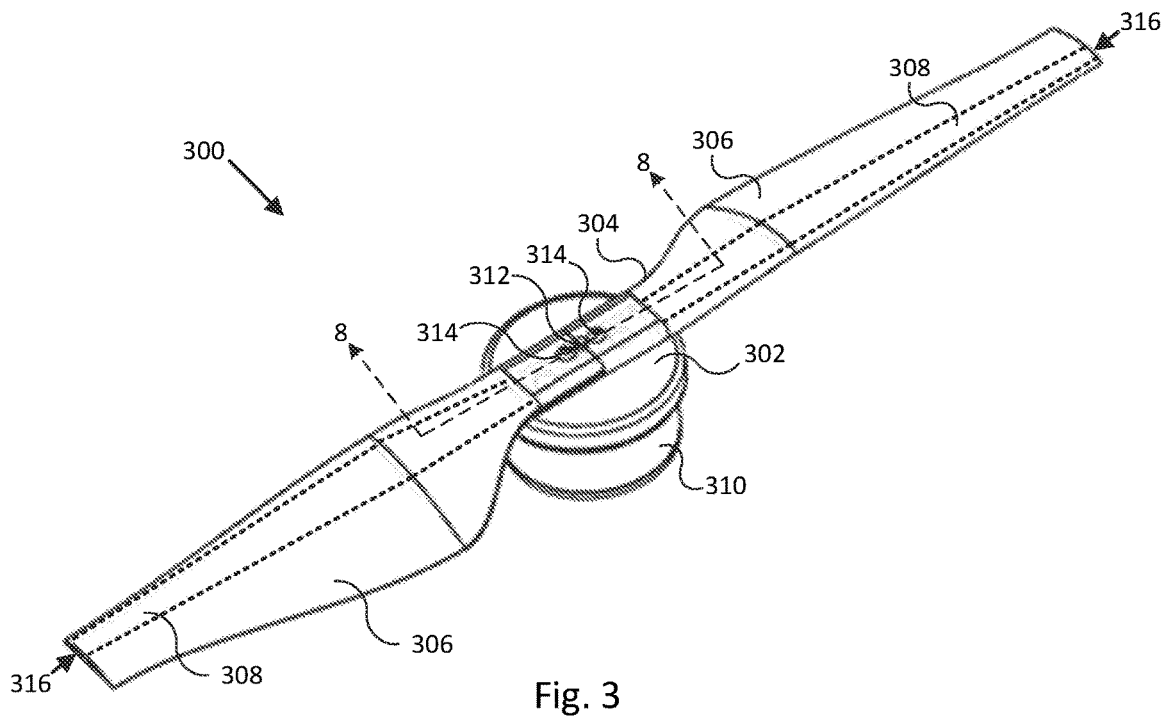
FIG. 3 illustrates an assembled view of a propeller blade deicing system in accordance with one or more embodiments of the disclosure.
Figure 4:
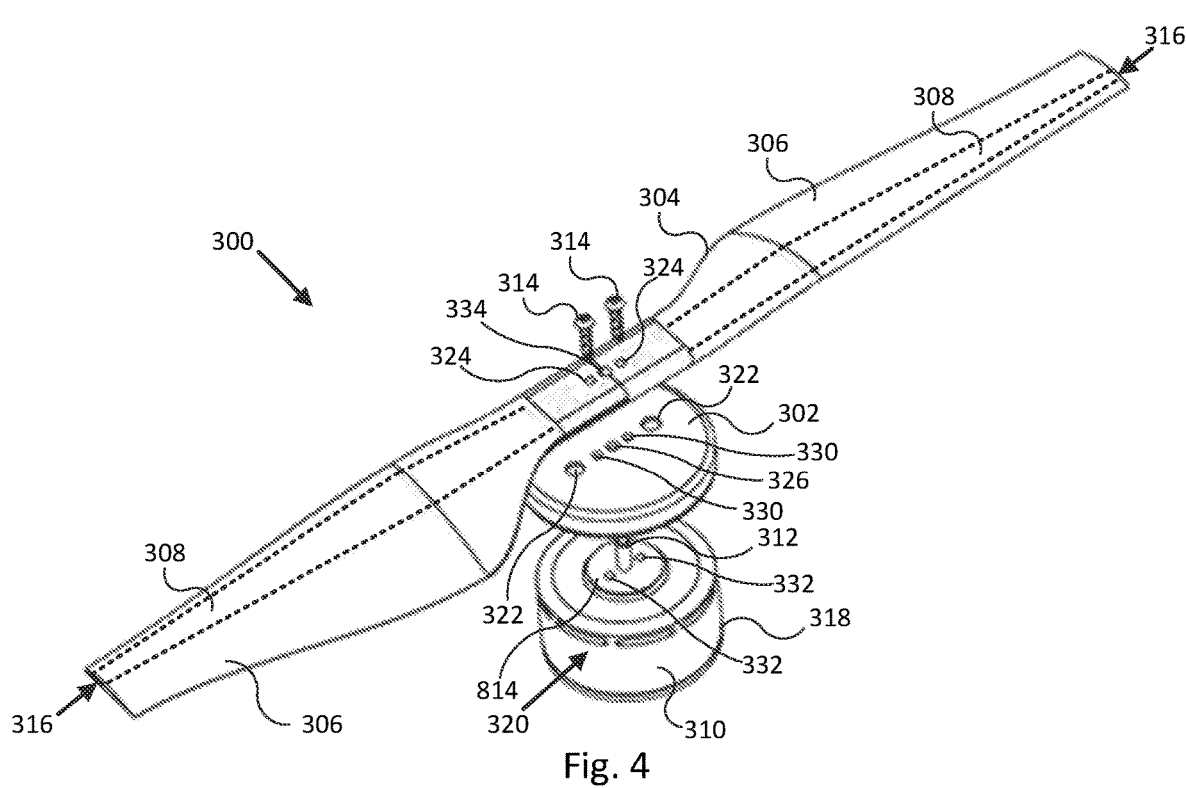
FIG. 4 illustrates an exploded view of the propeller blade deicing system of FIG. 3 in accordance with one or more embodiments of the disclosure.

FIG. 3 illustrates an assembled view of a propeller blade deicing system 300 for mobile platform 110 in accordance with one or more embodiments of the present disclosure. FIG. 4 illustrates an exploded view of propeller blade deicing system 300. The deicing system may include a cowl 302, a propeller 304, and a motor 310. In some embodiments, the deicing system 300 may be part of or may include propulsion system 124 of mobile platform 110. For example, deicing system 300 may be integrated into mobile platform 110 for each rotor of mobile platform 110 (e.g., in single or multi-rotor mobile platform embodiments). Propeller 304 may have a plurality of propeller blades 306 configured to couple to a rotor shaft 312 of motor 310. Propeller blades 306 may be shaped such that a rotation of rotor shaft 312 by operation of motor 310 may rotate propeller blades 306 to produce thrust for mobile platform 110.

Propeller blades 306 may be coupled to cowl 302 (e.g., via fasteners 314). Cowl 302 may be configured to couple to motor 310 to form a seal between cowl 302 and motor 310 to capture heated air exuded by motor 310 through vent(s) 320 of motor 310 (e.g., slots, apertures, cooling windows, etc.). For example, motor 310 may passively produce heated air such as through power loss that manifests itself through heating of motor 310. Cowl 302 may have air ducts 322 configured to direct the captured heated air into channels 308 of propeller blades 306. Each channel 308 may extend along a longitudinal axis of each propeller blade 306 from an ingress aperture disposed at a root of each propeller blade 306 to an egress aperture 316 disposed at the end of each propeller blade 306. Air ducts 322 of cowl 302 may be configured to direct the heated air captured by cowl 302 to the ingress apertures of propeller blades 306 so that the heated air may pass through channels 308 and exit through egress apertures 316. For example, air ducts 322 may have air ports that align and provide a sealed interface with the ingress apertures of propeller blades 306.

The heated air directed into channels 308 may transfer heat to propeller blades 306 and thereby deice propeller blades 306. In embodiments herein, deicing propeller blades 306 may include thawing ice that has formed on a surface of propeller blades 306 and/or preventing ice from forming on propeller blades 306.

In various embodiments, motor 310 may be an electric motor configured to receive a control signal (e.g., from controller 112 of mobile platform 110) to rotate rotor shaft 312 and thereby rotate propeller 304 to generate thrust for mobile platform 110. Although reference is primarily made to an outrunner electric motor implementation of propeller blade deicing system 300, in various implementations, the electric motor may be an outrunner or an inrunner brushless electric motor. As an example, in an outrunner implementation, a motor may spin its outer shell, including its rotor and housing, around its stator windings. Conversely, in an inrunner implementation, a motor may spin its rotor inside its stator.

Motor 310 is shown to include a rotor 814. Rotor 814 may include an outer housing 318 and vent(s) 320, which may be defined in rotor 814 and/or housing 318. When not covered by cowl 302, vent(s) 320 may allow for hot air to dissipate from an internal space of motor 310 to facilitate cooling certain internal components of motor 310 and surrounding hardware. When cowl 302 is coupled to motor 310, passively heated air may be exuded through vent(s) 320 by motor 310 and captured by cowl 302 through the assistance of the seal formed between cowl 302 and motor 310. Air ducts 322 may direct the captured heated air by cowl 302 into ingress apertures of propeller blades 306 so that the heated air may pass through channels 308 and discharge through egress apertures 316. As the heated air passes through propeller blades 306, heat transfer may occur to perform deicing of propeller blades 306.

Figure 5:
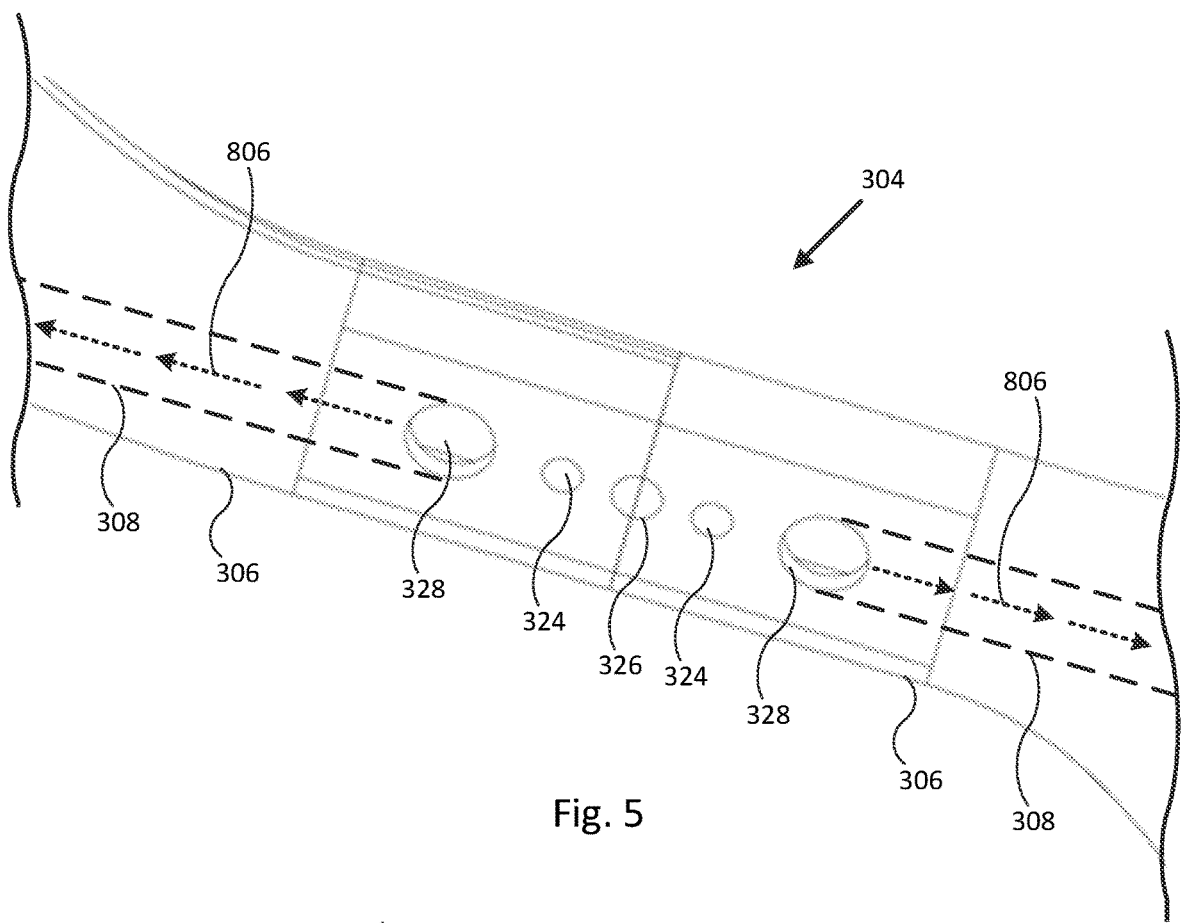
FIG. 5 illustrates a view of an underside of a propeller in accordance with one or more embodiments of the disclosure.

FIG. 5 illustrates a view of an underside of propeller 304 in accordance with one or more embodiments of the present disclosure. Through-holes 324 of propeller blades 306 may allow fasteners 314 to physically couple cowl 302 to propeller 304. Receiving interface 326 of propeller 304 may be configured to receive rotor shaft 312 to allow motor 310 to rotate propeller 304 to generate thrust for mobile platform 110. Ingress apertures 328 may be configured to align and provide a sealed interface with air ducts 322 of cowl 302 such that heated air 806 captured by cowl 302 can be directed into channels 308 of propeller blades 306. In some embodiments, ingress apertures 328 may be disposed co-radial or outside of motor vents 320 to improve efficiency such as through a direct air pathway for centrifugal force to move heated air through motor 310, cowl 302, and propeller blades 306.

Figure 6:
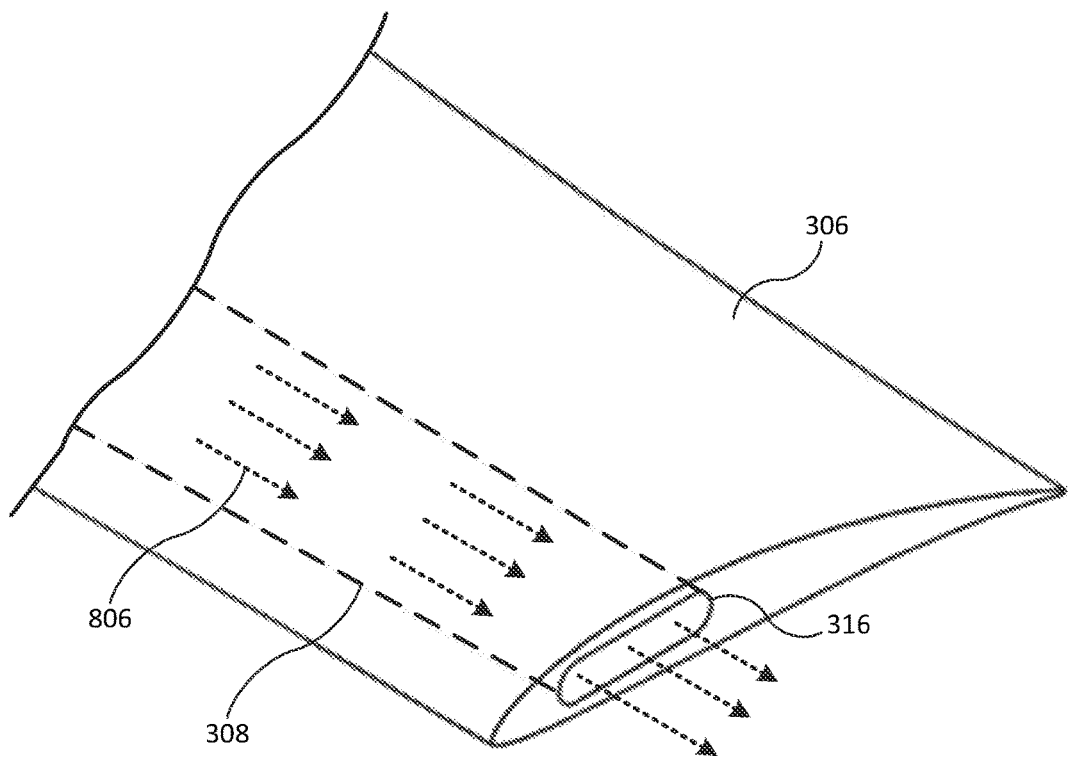
FIG. 6 illustrates a view of an egress aperture of a propeller blade in accordance with one or more embodiments of the disclosure.

FIG. 6 illustrates a view of egress aperture 316 of propeller blade 306 in accordance with one or more embodiments of the present disclosure. As shown in FIG. 6, channel 308 may be an internal hollow channel defined in propeller blade 306 through which captured heated air 806 flows. Although reference is primarily made herein to egress aperture 316 disposed at a tip of propeller blade 306, it will be appreciated that egress aperture 316 may be disposed at various locations of propeller blade 306 (e.g., tip, top, bottom, leading edge, trailing edge, etc.), such as to improve aerodynamic efficiency. For example, ejecting heated air 806 from the tip in line with the propeller blade 306 may improve aerodynamic efficiency by providing an effective air seal between a rotor and a shroud used in ducted fan propulsion system embodiments. As another example, ejecting heated air 806 down from the tip of propeller blade 306 may improve aerodynamic efficiency by operating as a tip plate to reduce induced drag of the propeller 304.

Propeller blades 306 may be manufactured to provide a hollow channel according to several embodiments of the disclosure. In one embodiment, propeller blades 306 may be manufactured using sheet metal. For example, propeller blade 306 may be assembled (e.g., glued, welded, riveted) using preformed sheet metal sections. It should be noted that a cavity formed in a sheet metal propeller blade may provide a relatively light structure.

In another embodiment, propeller blade 306 may be manufactured as a composite blade. For example, propeller blade 306 may be assembled from preformed metal and plastic components. Cavities in a composite blade may be part of an individual component or may be formed during assembly using several of the components. In some implementations, such as for small drones, a composite blade may have a carbon tube spar and a foam airfoil around the carbon tube spar.

In another embodiment, propeller blade 306 may be manufactured using metal casting. For example, cavities in propeller blade 306 may be formed during casting using special plugs. The plugs may be removed during post machining. For example, clay/ceramic plugs may be powdered with ultrasound and then blown out of the blade to provide a hollow blade.

In another embodiment, propeller blade 306 may be manufactured using additive manufacturing (e.g., 3D printing). In this embodiment, propeller blade 306 may be 3D printed using metal and/or plastic.

In another embodiment, propeller blade 306 may be manufactured with a foam core. For example, the blade may be formed in a mold using multiple layers of composite materials and a foam core. In some embodiments, channel 308 may be defined in a foam core of propeller blade 306. For example, the foam core may be chemically removed (e.g., dissolved) to form a cavity of channel 308 in propeller blade 306.

In yet another embodiment, propeller blade 306 may be manufactured using extrusion. Blades manufactured using extrusion may be non-twisted and may provide a uniform cross-section.

Figure 7A:
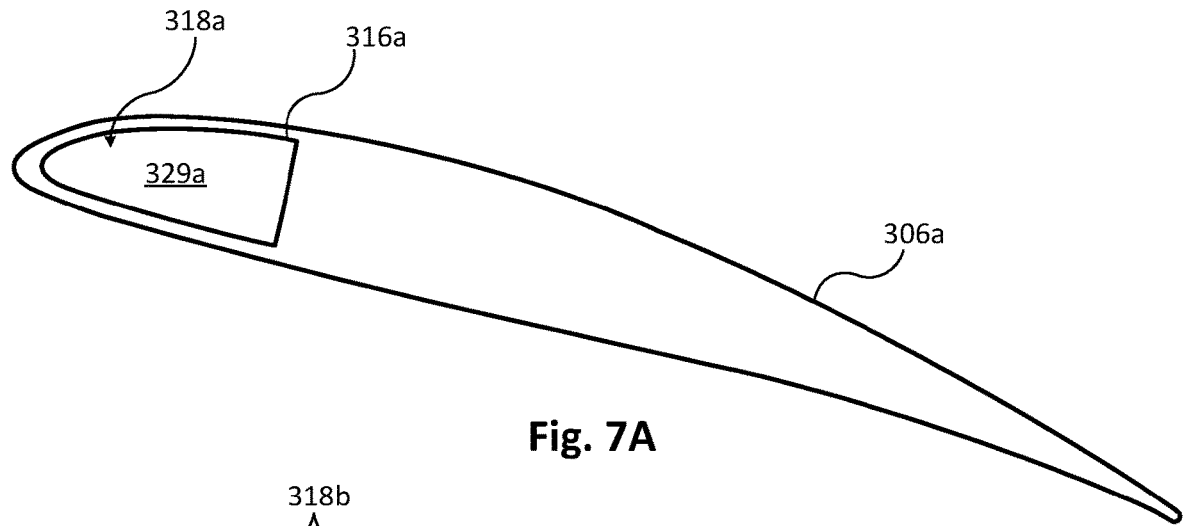
FIGS. 7A-7C illustrate end views of example propeller blades having various channel configurations in accordance with one or more embodiments of the disclosure.
Figure 7B:
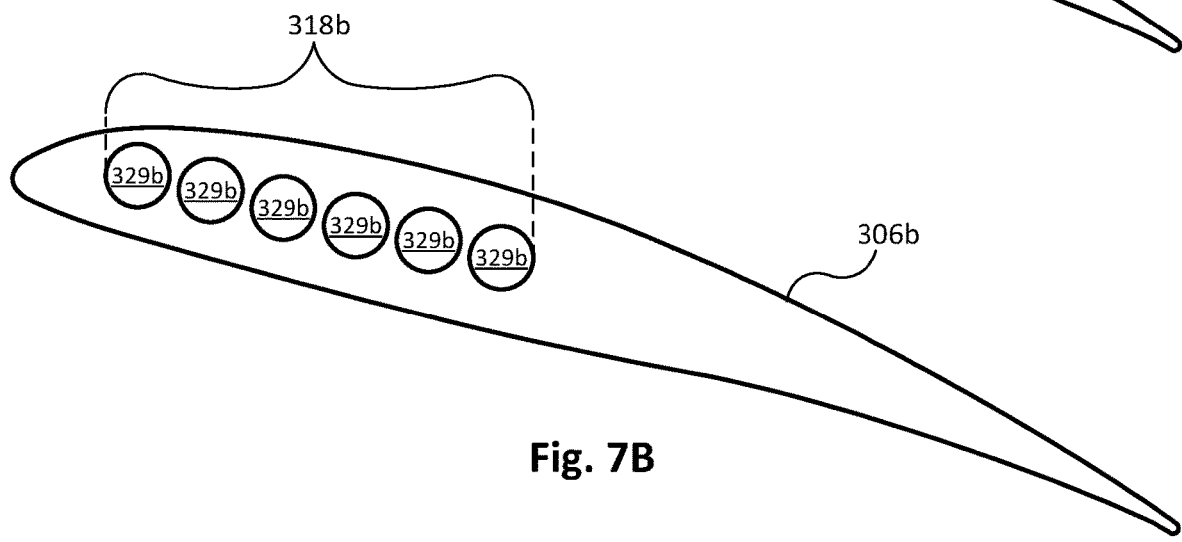
Figure 7C:
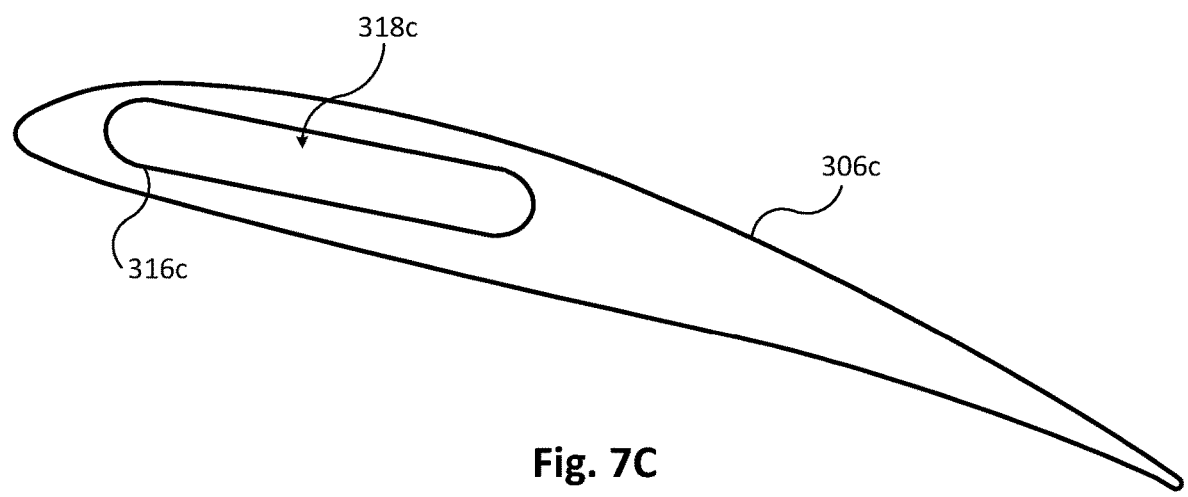

FIGS. 7A-7C illustrate end views of example propeller blades 306a-306c having various channel configurations 318a-318c in accordance with embodiments of the present disclosure. In example propeller blade 306a, a channel 318a may have a cavity 329a that is defined at least in part by a shape of propeller blade 306a (e.g., a leading edge of propeller blade 306a) and connects an ingress aperture of propeller blade 306a to an egress aperture 316a. In example propeller blade 306b, a channel 318b may have a plurality of cavities 329b that connect an ingress aperture of propeller blade 306b to an egress aperture. In example propeller blade 306c, a channel 318c may be substantially obround in shape and connect an ingress aperture of propeller blade 306c to an egress aperture 316c.

The propeller blades 306a-306c shown in FIGS. 7A-7C are non-limiting examples as it will be appreciated that a shape and number of cavities in a channel of a propeller blade to suit a desired application may be defined based at least on a blade airfoil, blade structure, and amount of heat flow available for deicing.

Figure 8:
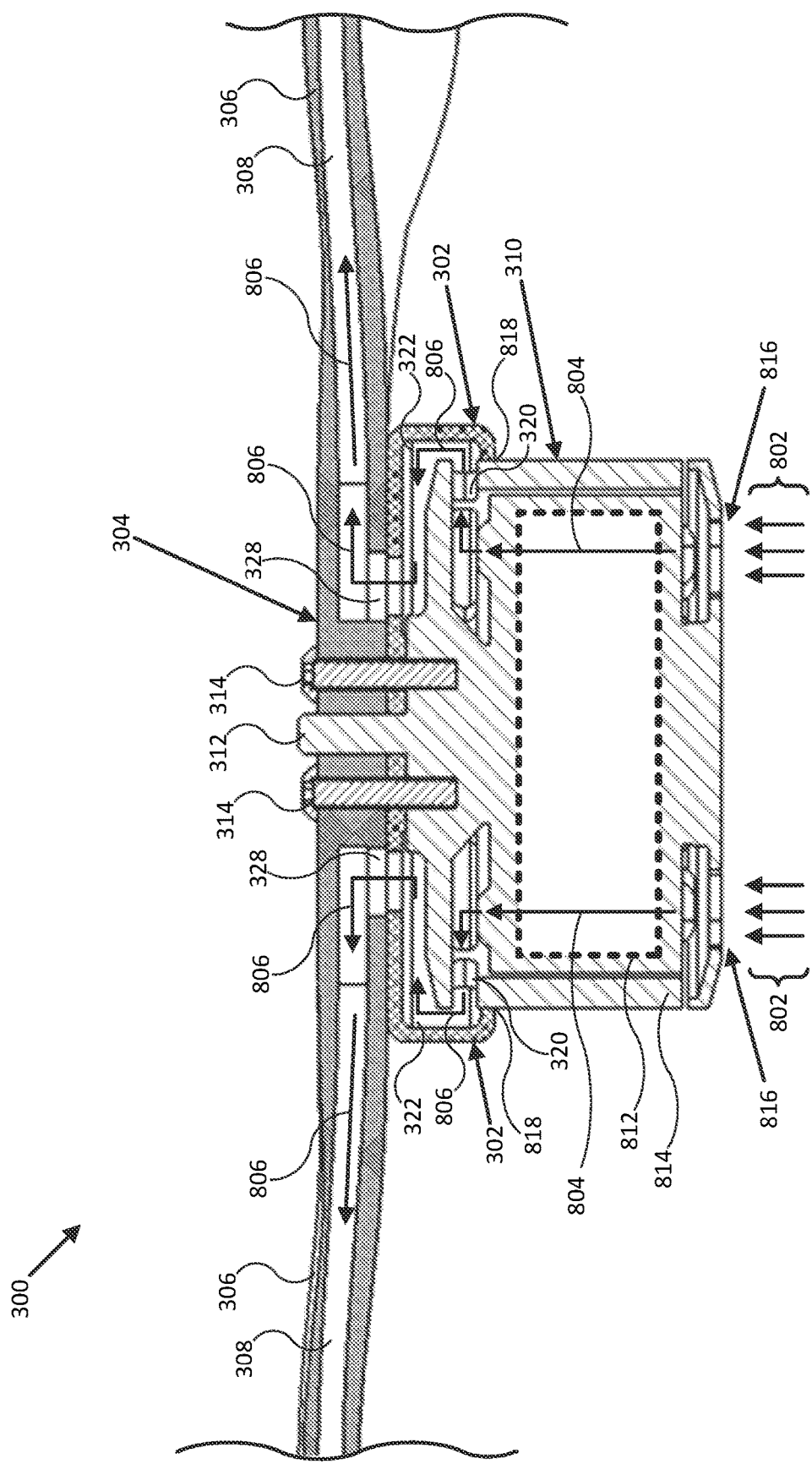
FIG. 8 illustrates a cross-sectional view of the propeller blade deicing system of FIG. 3, as seen along the lines of the section 8-8 taken therein, in accordance with one or more embodiments of the disclosure.

FIG. 8 illustrates a cross-sectional view of propeller blade deicing system 300 of FIG. 3, as seen along the lines of the section 8-8 taken therein. FIG. 8 is further described below in relation to FIG. 9.

Figure 9:
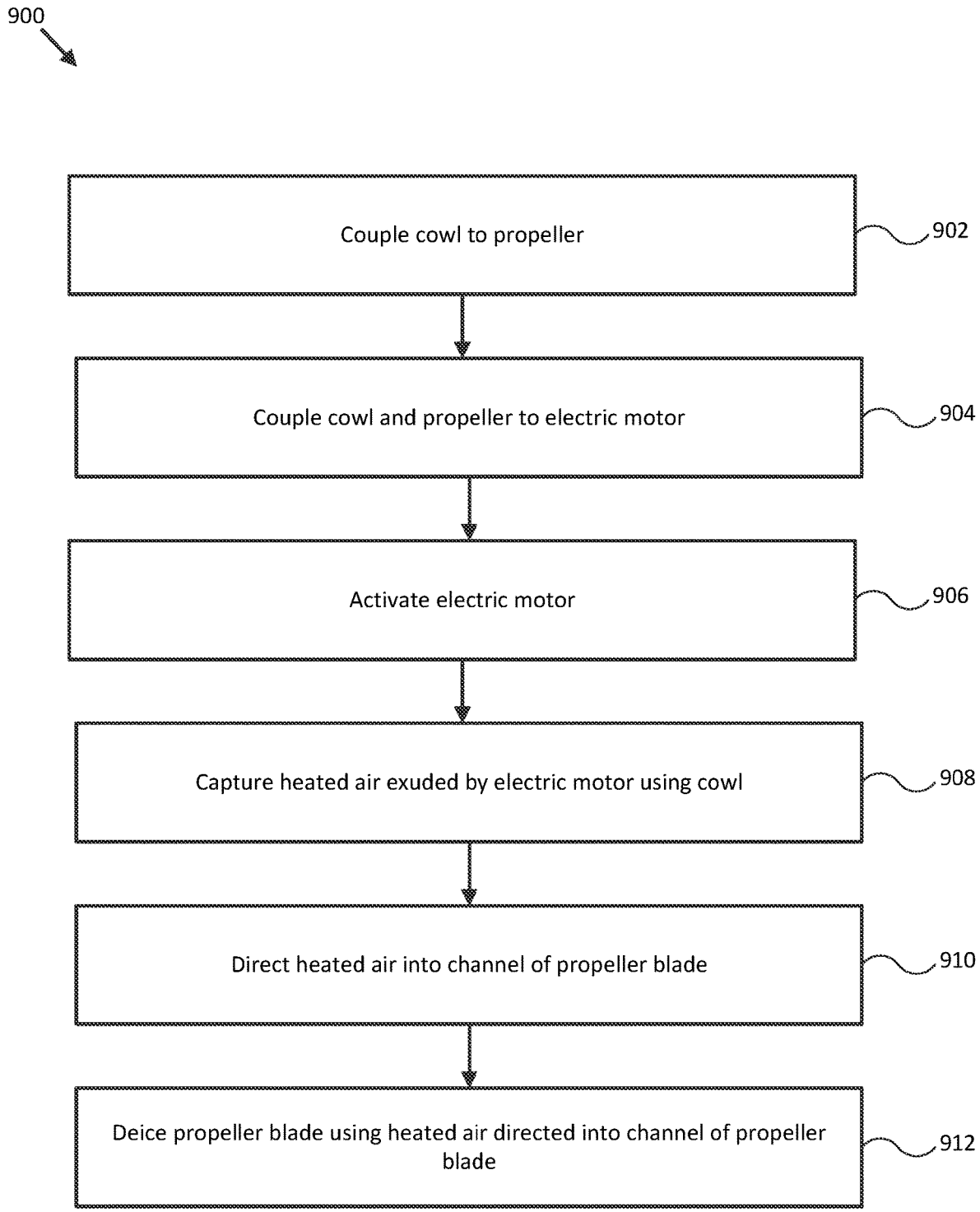
FIG. 9 illustrates a flow diagram of a process for deicing a mobile platform in accordance with one or more embodiments of the disclosure.

FIG. 9 illustrates a flow diagram of a process 900 for deicing a mobile platform 110 using deicing system 300 in accordance with one or more embodiments of the disclosure. It should be appreciated that any step, sub-step, sub-process, or block of process 900 may be performed in an order or arrangement different from the embodiments illustrated by FIG. 9. For example, in some embodiments, one or more blocks may be omitted from or added to process 900. Note that in describing FIG. 9, reference may be made to FIGS. 1-8, however, it will be appreciated that embodiments of FIG. 9 are not limited by FIGS. 1-8. It will further be appreciated that although process 900 is described in reference to one propeller, process 900 can be performed to deice each propeller of a multi-rotor mobile platform.

At block 902, cowl 302 may be coupled to propeller 304. For example, as shown in FIG. 4, fasteners 314 may be inserted into through-holes 324 of propeller 304 and through-holes 330 of cowl 302 to couple cowl 302 to propeller 304. At block 904, cowl 302 and propeller 304 may be coupled to motor 310. For example, as shown in FIG. 4, fasteners 314 may be received by interface 332 of rotor 814. Rotor shaft 312 may be inserted into through-hole 326 and received by interface 334 of propeller 304. Thus, rotation of rotor 814 by operation of motor 310 may cause rotation of cowl 302 and propeller 304. As further discussed below, the coupling of cowl 302 to motor 310 may form a seal 818 configured to capture heated air 804 exuded from motor 310.

At block 906, motor 310 may be activated. For example, controller 112 may send a control signal to motor 310 to cause motor 310 to rotate rotor 814 and thereby propeller 304. In some embodiments, the control signal may cause motor 310 to rotate rotor 814 sufficiently enough to generate thrust for mobile platform 110 to physically move mobile platform 110. In other embodiments, the control signal may cause motor 310 to rotate rotor 814 sufficiently enough to passively generate heat to deice propeller 304 without physically moving mobile platform 110, such as prior to lift-off, when deicing propeller 304 may be desired.

Referring to FIG. 8, to generate thrust for mobile platform 110, motor 310 may be activated to selectively charge electromagnets in a stator 812 to rotate a rotor 814 through 360 degrees and thereby rotate propeller 304 which may be coupled to the rotor 814 via rotor shaft 312 and cowl 302.

When motor 310 is activated, ambient air 802 may be drawn into motor 310 through an air intake 816. In some embodiments, air intake 816 may include a plurality of apertures that allow the ambient air 802 to be drawn into motor 310. In some embodiments, motor 310 may be configured to operate as a centrifugal fan to enhance air flow through motor 310 (e.g., drawing ambient air 802 through air intake 816 and dissipating through vents 320). Ambient air 802 may be passively heated when passing over active components of motor 310 (e.g., stator 812, windings, and magnets) to provide heated air 804. For example, power loss through heat may provide the passive heating of ambient air 802.

At block 908, heated air 804 exuded by motor 310 may be captured by cowl 302. For example, as shown in FIG. 8, heated air 804 may flow through vents 320 and be captured, as shown at 806, in air ducts 322 of cowl 302. To facilitate capturing heated air 804 exuded by motor 310, cowl 302 may be coupled to motor 310 such that a seal 818 is formed between cowl 302 and motor 310. Seal 818 may be airtight to prevent any captured heated air 804 from escaping between cowl 302 and motor 310. In some embodiments, air ducts 322 may be formed, at least in part, by a surface of cowl 302 facing a surface of rotor 814.

At block 910, the captured heated air 806 may be directed into channels 308 of propeller blades 306. For example, as shown in FIG. 8, air ducts 322 may align with ingress apertures 328 to direct the captured heated air 806 into channels 308. In this regard, air ducts 322 may have ports that interface with ingress apertures 328, or vice versa, such that a seal is formed to prevent loss of the captured heated air 806 as it flows into channels 308.

In some embodiments, a centrifugal force provided by rotation of propeller 304 may facilitate the flow of the captured heated air 806 from motor 310 through air ducts 322 and through channels 308.

At block 912, propeller blades 306 may be deiced as the captured heated air 806 flows through channels 308 and exits egress apertures 316. Deicing propeller blades 306 may include thawing and preventing ice on propeller blades 306 via heat transfer from the captured heated air 806 to propeller blades 306. For example, heat provided by the captured heated air 806 may transfer to propeller blades 306 such that ice that has formed on propeller blades 306 reaches a melting point and melts off of propeller blades 306. The heat transfer to propeller blades 306 provided by the captured heated air 806 may further prevent the formation of ice on propeller blades 306. Thus, in this regard, when motor 310 is operating to generate thrust for mobile platform 110, passive deicing and prevention of ice formation on propeller blades 306 may be performed as ambient air 802 is heated by motor 310, captured by cowl 302, and directed into channels 308.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system, comprising:
    a propeller comprising a propeller blade having a channel extending from an ingress aperture to an egress aperture along a longitudinal axis of the propeller blade; and
    a cowl configured to removably couple to the propeller and an electric motor and form a seal between the cowl and the electric motor to capture heated air exuded by the electric motor, wherein:
        the cowl comprises an air duct configured to direct the heated air into the channel to deice the propeller blade when the cowl is coupled to the propeller and the electric motor; and
        the heated air is allowed to dissipate from the electric motor when the cowl is removed and the propeller is coupled to the electric motor.

2. The system of claim 1, further comprising the electric motor configured to rotate the propeller to generate a thrust for a mobile platform, wherein the channel comprises a plurality of cavities, and wherein a centrifugal force provided by the rotation of the propeller facilitates flow of the heated air through the plurality of cavities.

3. The system of claim 2, wherein the electric motor comprises an outer housing having a plurality of vents from which the heated air is exuded by the electric motor and captured by the cowl and directed into the channel when the cowl is coupled to the propeller and the electric motor;
    wherein the heated air is allowed to dissipate from the electric motor through the vents when the cowl is removed and the propeller is coupled to the electric motor.

4. The system of claim 2, wherein:
    the electric motor comprises an air intake disposed outside of the seal between the cowl and the electric motor;
    the rotation of the propeller blade draws ambient air into the electric motor through the air intake;
    the ambient air is heated by the electric motor and exuded as the heated air that is captured by the cowl and directed into the channel when the cowl is coupled to the propeller and the electric motor; and
    the system further comprises one or more fasteners configured to couple the cowl to the propeller and the electric motor when the cowl is coupled to the propeller and the electric motor;
    wherein the one or more fasteners couple the propeller to the electric motor when the cowl is removed.

5. The system of claim 1, wherein the propeller blade is one of a plurality of propeller blades of the propeller.

6. The system of claim 1, wherein the cowl comprises a first surface and a second surface opposite to the first surface, wherein when the cowl is coupled to the propeller and the electric motor, the first surface faces the propeller and the second surface faces the electric motor.

7. The system of claim 1, wherein the channel is defined in a foam core of the propeller blade.

8. The system of claim 1, comprising a multi-rotor mobile platform, in which:
    the cowl is one of a plurality of cowls;
    the propeller is one of a plurality of propellers;
    the electric motor is one of a plurality of electric motors, wherein each one of the cowls and each one of the propellers are coupled to each one of the electric motors, respectively.

9. A mobile platform comprising:
    a propeller comprising a propeller blade having a channel extending from an ingress aperture to an egress aperture; and a cowl comprising an air duct configured to direct heated air into the channel to deice the propeller blade, the cowl is configured to removably couple to the propeller and an electric motor so that the air duct is aligned with the ingress aperture of the propeller, and form a seal between the cowl and the electric motor to capture the heated air exuded by the electric motor and direct the heated air into the channel.

10. The mobile platform of claim 9, wherein the cowl is removably coupled to the propeller by one or more fasteners being inserted into through-holes of the propeller and through-holes of the cowl, and wherein the heated air is allowed to dissipate from the electric motor when the cowl is removed and the propeller is coupled to the electric motor.

11. A method comprising:
activating an electric motor to generate a thrust for a mobile platform, wherein the activating causes a rotation of a propeller, wherein the propeller comprises a propeller blade having a channel extending from an ingress aperture to an egress aperture along a longitudinal axis of the propeller blade;
capturing heated air exuded by the electric motor using a cowl comprising an air duct configured to direct heated air into the channel to deice the propeller blade, wherein the cowl is removably coupled to an underside of the propeller and an electric motor so that the air duct is aligned with the ingress aperture of the propeller, the cowl forming a seal between the cowl and the electric motor to capture the heated air exuded by the electric motor; and
directing the captured heated air into the channel via the air duct to deice the propeller blade.

12. The method of claim 11, further comprising exuding the heated air through a plurality of vents disposed in an outer housing of the electric motor and covered by the seal, wherein the exuded heated air is captured and directed into the channel by the cowl.

13. The method of claim 11, further comprising:
passively drawing ambient air into the electric motor through an air intake of the electric motor disposed outside of the seal between the cowl and the electric motor; and
passively heating the ambient air by the electric motor during the generating the thrust, wherein the passively heated ambient air is the heated air captured and directed into the channel by the cowl.

14. The method of claim 11, wherein the propeller blade is one of a plurality of propeller blades of the propeller, and wherein the heated air is allowed to dissipate from the electric motor when the cowl is removed and the propeller is coupled to the electric motor.

15. The method of claim 14, wherein a cavity of the channel is defined at least in part by a shape of the propeller blade, wherein the cavity comprises a plurality of cavities, and wherein a centrifugal force provided by the rotation of the propeller facilitates flow of the heated air through the plurality of cavities.

16. The method of claim 14, wherein the channel is defined in a foam core of the propeller blade.

17. The method of claim 11, further comprising:
removing the cowl; and
activating the electric motor with the propeller coupled to the electric motor when the cowl is removed.

18. The method of claim 11, further comprising:
performing the activating, the capturing, and the directing for a plurality of propellers of the mobile platform to deice propeller blades of the plurality of propellers.

19. The method of claim 11, further comprising:
coupling the cowl to the propeller; and
coupling the cowl and the propeller to the electric motor such that the seal is formed between the cowl and the electric motor.

20. The method of claim 11, wherein the cowl is removably coupled to the propeller by one or more fasteners being inserted into through-holes of the propeller and through-holes of the cowl.

* * * * *